April 2, 1963
J. A. SEVERIN
3,084,276
TRANSISTORIZED DYNAMIC FOCUS CIRCUIT
Filed Jan. 18, 1960
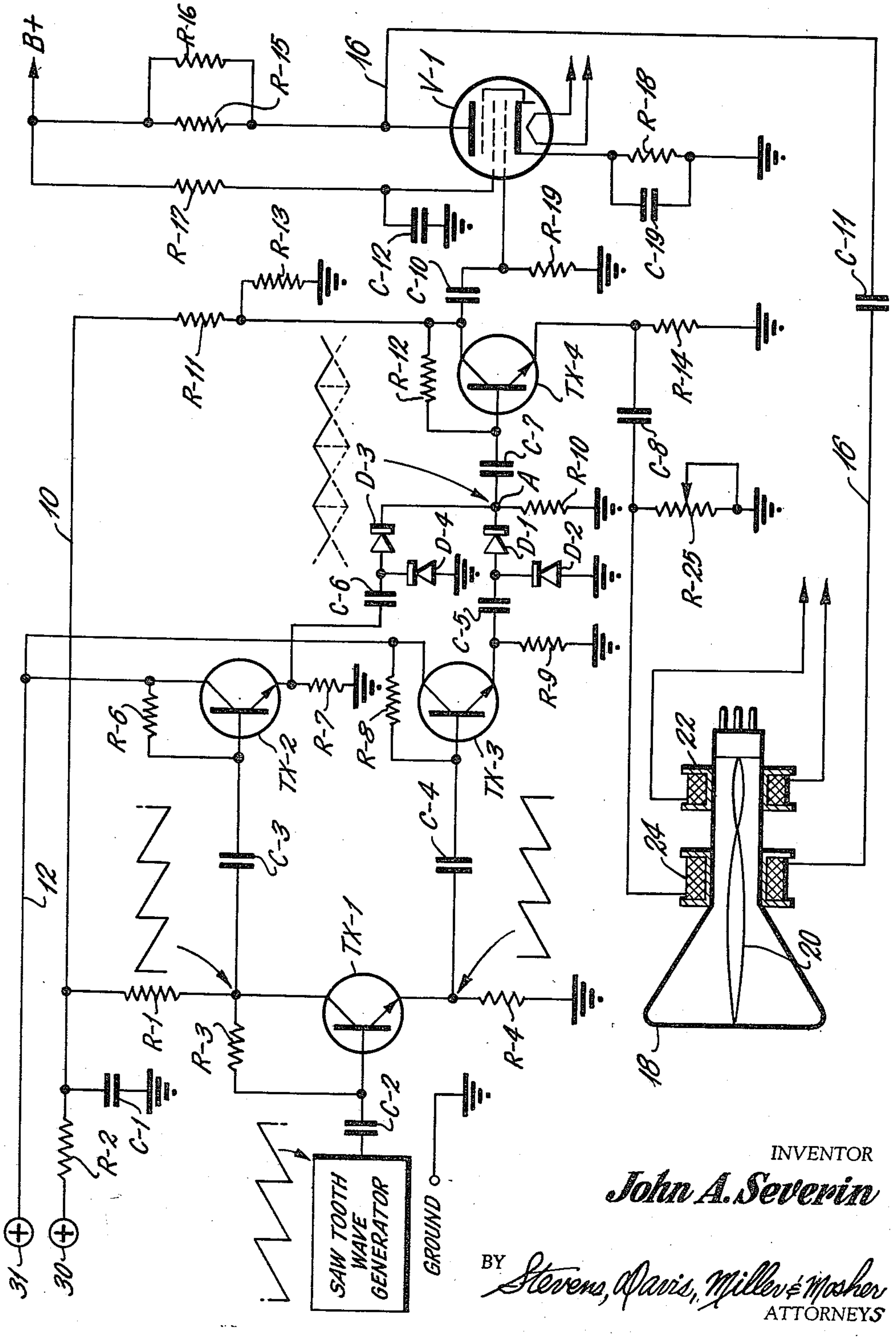
INVENTOR
John A. Severin
BY Stevens, Davis, Miller & Mosher
ATTORNEYS

3,084,276
TRANSISTORIZED DYNAMIC FOCUS CIRCUIT

John A. Severin, Dallas, Tex., assignor to Texas Instruments Incorporated, Dallas, Tex., a corporation of Delaware Filed Jan. 18, 1960, Ser. No. 2,973
8 Claims. (Cl. 315—27)

This invention relates to cathode ray tube control systems, and more particularly to beam focusing circuitry for preventing a cathode ray trace from becoming unfocused as the electron beam sweeps across the face of a tube.

In many modern cathode ray tube applications, it is often necessary to employ a tube which has a flat end surface. Mapping radar systems for instance requires the use of a cathode ray tube with a flat display surface to reduce distortion. When a flat surface is thus utilized, there is a tendency for the electron beam to de-focus because of the difference in the path length which the electrons in the beam must follow during the sweep. The de-focusing which occurs in a cathode ray tube having a flat face may be contrasted with conditions in a conventional cathode ray tube. The end face of a conventional cathode ray tube is slightly curved to provide a uniform path length for the electron beam as it sweeps across the inner surface of such a tube and thus prevent de-focusing.

Where conditions require the use of a flat-faced picture tube, there is a loss in resolution occasioned by the de-focusing action explained immediately above. For example, a .7 mil diameter trace is known to de-focus to approximately 2 mils diameter at the end of the trace near the edge of a flat-faced tube.

According to the present invention, means are provided for regulating the focus point of an electron beam during the horizontal sweep in order to compensate for the different path lengths traveled by the electrons in the beam as it crosses a flat screen. In this manner, greatly superior resolution of target data is provided in the pattern traced across the end surface of the cathode ray tube. In accomplishing this function, two focus coils are used to provide extremely sharp definition over the full sweep of the electron beam. The first focus coil comprises a constant current coil which may draw a nominal value of current that does not vary. A variable current dynamic focus coil is also used as an electromagnetic lens to sharpen the focus of the beam at the edges of the tube. The current flowing through the dynamic focus coil takes the form of a V-shaped current pulse which is produced and shaped by the circuitry. The current in this pulse falls from a maximum initial value when the beam is at one edge of the tube to a minimum value when the beam is centered and then rises back to its maximum value when the beam is at the end of the trace at the opposite edge of the tube. The magnetic focusing produced by the second coil changes the focal point of the electron beam in a manner which yields optimum resolution over the entire sweep across the tube face.

Accordingly, therefore, a primary object of this invention is to provide a circuit for regulating current used to focus a cathode ray thereby to compensate for differences in electron beam path lengths encountered in a flat-faced tube.

Another object of this invention is to provide a system for obtaining superior resolution in the luminous pattern traced across the end surface of a flat-faced cathode ray tube.

A further object of the present invention is to provide a transistorized circuit for generating a V-shaped pulse of focusing current for regulating the degree of convergence of a moving beam of charged particles.

These and other objects of the present invention will become apparent by referring to the accompanying sole drawing and to the following detailed description.

Turning to the details of the circuitry, reference to the left-hand portion of the drawing will now be made. In this portion of the drawing, a first positive bus 10 is connected to a constant voltage source 30. The positive bus 10 is connected to supply this constant operating voltage to transistors TX–1 and TX–4 via load resistors R–1 and R–11, respectively. Resistor R–13 forms a voltage divider with resistor R–11. Resistor R–2 and capacitor C–1 constitute a filter circuit provided to remove any noise from the supply voltage. The positive bus 12 is connected to a suitable source of operating potential 31 and supplies operating voltage to transistors TX–2 and TX–3. Separate sources of operating potential are provided as transistors TX–1 and TX–4 are much more sensitive to fluctuations in operating potential than transistors TX–2 and TX–3.

A saw-tooth wave which is synchronized with the sweep of the cathode ray tube is supplied to the input terminal by a saw-tooth wave generator 32. The saw-tooth wave is applied to the base electrode of transistor TX–1, via a coupling capacitor C–2. Bias resistor R–3 interconnects the base electrode of the transistor TX–1 and the collector electrode. The emitter electrode of transistor TX–1 is connected to ground by means of resistor R–4.

Transistor TX–1 is connected to function as a phase inverter and the saw-tooth waves appearing at the collector and emitter are 180° out of phase. The output at the collector is fed to base of transistor TX–2 via coupling capacitor C–3, and the output at the emitter is fed to the base of transistor TX–3 via coupling capacitor C–4. Transistors TX–2 and TX–3 are connected as emitter followers and provide current amplification only. Bias resistors R–6 and R–8 interconnect the base and collector electrodes of transistors TX–2 and TX–3, respectively. Resistors R–7 and R–9 are emitter load resistors and connect the emitters of transistors TX–2 and TX–3 respectively, to ground. The output wave form from transistor TX–2 is identical in phase and shape to the voltage conducted thereto via capacitor C–3; and the output wave form from transistor TX–3 is identical in phase and shape to the voltage conducted thereto via capacitor C–4. However, the two output voltages differ from each other in phase by 180°.

The signal outputs from transistors TX–2 and TX–3 are jointly used in producing a composite potential at point A shown immediately to the right of these two transistors. To this end, the potential developed at the upper end of the resistor R–9 is applied to point A through a coupling capacitor C–5 and diode D–1. The junction between capacitor C–5 and diode D–1 is asymmetrically shunted to ground by means of a diode D–2 which is poled oppositely with respect to the diode D–1. Diode D–2 serves to clamp the output from transistor TX–3 to ground potential.

Immediately above this circuit, the signal voltage developed at the ungrounded end of emitter resistor R–7 is conveyed to point A by means of a coupling capacitor C–6 and a diode D–3 connected in series. The common point between capacitor C–6 and diode D–3 is tied asymmetrically to ground through a diode D–4 which is poled oppositely with respect to the diode D–3. Diode D–4 serves to clamp the output from transistor TX–2 to ground potential.

The triangle wave produced at point A as a result of the action of the diode networks is developed across a resistor R–10. This triangle wave is then applied to the base of transistor TX–4 by means of a coupling capacitor C–7. Bias resistor R–12 interconnects the base and collector electrodes of transistor TX–4. The emitter of transistor TX–4 is grounded via resistor R–14.

The triangle wave is produced as follows. The potential at the emitter of transistor TX–2 is at a maximum at the beginning of a cycle. At the same instant, the potential at the emitter of transistor TX–3 is at a minimum. Hence, diode D–3 will conduct via resistor R–10. The voltage developed across resistor R–10 will back bias diode D–1 to cut off. However, the potential at the emitter of transistor TX–3 continually rises during each cycle, whereas the potential at the emitter of transistor TX–2 falls, and there comes a time when the potential at the emitter of TX–3 has risen sufficiently to overcome the back bias on diode D–1. At this time diode D–1 starts to conduct via resistor R–10. In the meantime, the potential at the emitter of transistor TX–2, which falls continually during each cycle, has fallen sufficiently that when diode D–1 starts to conduct, a back bias is applied to diode D–3 cutting it off. The potential at point A, therefore, starts each cycle at a maximum, falls to a minimum at the instant when diode D–1 starts conducting and diode D–3 is cut off, and then rises back to the maximum potential. The composite wave form is triangle-shaped as illustrated in the drawing.

The output at the collector of transistor TX–4 is passed via coupling capacitor C–10 and bias resistor R–19 to the grid of pentode space discharge device V–1. The device V–1 is provided with an anode eletcrode connected to a suitable source of B+ (not shown) by way of resistor R–15. The screen grid of the pentode V–1 is also connected to B+ through a dropping resistor R–17, and the common junction between this resistor and the screen grid is connected to ground by a capacitor C–12. The cathode of the pentode tube is tied to ground through a resistor R–18 and a capacitor C–19 connected in parallel, and the suppressor grid of the tube is tied to the cathode and is maintained at the cathode potential in the usual way. The tube V–1 provides voltage amplification and a triange wave is applied to conductor 16 and thence to one side of the dynamic focus coil 24 via a capacitor C–11.

In the lower left-hand portion of the drawing, the numeral 18 is used to designate diagrammatically a cathode ray tube of the flat-faced type. Within this tube there is produced a beam of electrons 20 which is focused upon the inner end surface of the tube to trace a luminous pattern. The beam of electrons is subjected to the action of a first constant current focus coil 22 which may, for example, draw current of the order of 18 milliamps. The relative convergence or force point of the electront beam is also controlled by the variable current dynamic focus coil 24 which is connected to receive the triangle-shaped current pulses derived by the circuitry described above. To this end, the current applied to coil 24 will maintain the point of convergence of the electron beam on the inner face of the tube at any point in its sweep.

The opposite end of the winding of the dynamic focus coil 24 is connected back to the common junction between the resistor R–14 and the emitter of transistor TX–4 via blocking capacitor C–8. A variable resistor R–25 connects the common junction between capacitor C–8 and coil 24 to ground. The variable resistor R–25 controls the level of current passing through the dynamic focus coil 24 by a unique feedback arrangement. To illustrate how this works, assume a pre-selected setting for resistor R–25 to hold a desired current level in dynamic focus coil 24. Now if the current should increase through the coil 24 and resistor R–25, this will cause the emitter potential of transistor TX–4 to move closer to the base potential driving the transistor toward cut-off. Thus, the collector potential goes more positive. It will be appreciated from the nature of the circuitry that the voltage across resistor R–25 appears on the emitter of transistor TX–4. The change in collector potential appears on the grid of tube V–1 causing it to conduct more and hence the output signal from tube V–1 will decrease. This is reflected in the coil 24 circuit via capacitor C–11 and serves to reduce the current level. If the current should decrease through the coil 24 and resistor R–25, an opposite effect will be produced—the output tube V–1 will increase, increasing the current level. As transistor amplifiers connected as transistor TX–4 is connected operate with the potential at the emitter close to the base potential, making the gain of the transistor sensitive to small changes in bias voltage, and because of the high gain in tube V–1, the circuit is extremely sensitive to changes in current or changes in the resistance of R–25.

The negative feedback from the voltage developed across resistor R–25 performs a dual function. Not only does it control the magnitude of compensating current that flows through coil 24, but in addition it is effective to ensure that the current through coil 24 is substantially in phase with the voltage appearing at point A.

As will be apparent from an inspection of the circuits, with no feedback, the voltage at the plate of tube V–1 will be substantially in phase with the voltage appearing at point A. However, even though capacitor C–11 may tend to partially compensate for the inductive reactance of coil 24, the composite impedance presented by the path via lead 16 to ground is substantially inductive. As a consequence, current flowing through coil 24 will lag substantially behind the voltage which appears at the plate of tube V–1, and in the absence of feedback, the corresponding compensation would be degraded. However, as mentioned above, the current flowing through coil 24 also flows through resistor R–25 and, because R–25 is purely resistive, the corresponding voltage developed thereacross is in phase with the current. This voltage is passed through capacitor C–8 to the emitter of transistor TX–4 where it is effective as negative feedback. Consequently, the voltage wave forms appearing at the collector of transistor TX–4 and the grid and plate of tube V–1 are effectively moved forward in phase by an amount sufficient to bring the current flowing through coil 24 into substantial phase-synchronism with the voltage at point A. Thus, compensation is made in phase synchronism with the movement of the beam trace across the face of the tube.

Not only is the feedback applied to the emitter of transistor TX–4 effective to overcome the otherwise disadvantageous effects of coil reactance, but it is additionally effective to stabilize and improve the characteristics of those portions of the circuits which comprise transistors TX–4 and tube V–1. Consequently, the circuits are effective over an increased range of operating conditions to accomplish the desired compensation.

In conclusion, it will be evident that the invention is disclosed in full, clear and concise terms as will enable those skilled in the art to practice and understand it. However, it will be understood that certain modifications, substitutions and alterations may be made therein without departing from the spirit and scope of the appended claims. For example, tube V–1 can be replaced by a suitable transistor provided a focus coil having the necessary impedance is used.

What is claimed is:

1. In a transistorized dynamic focus circuit for a cathode ray tube provided with a variable current dynamic focus coil, a first transistor provided with base, emitter and collector electrodes, input means connected to said base electrode, separate output means connected to said collector electrode and said emitter electrode, a pair of transistors provided each with base, emitter, and collector electrodes, each said collector electrode connected to a suitable power supply, each said base electrode connected to one of said output means, a pair of rectifier means, each said emitter electrode of said pair of transistors connected to one of said rectifier means, common means interconnecting said rectifier means, and amplifying means connected to said common means to amplify a signal received from said common means for application to said dynamic focus coil.

2. In a transistorized dynamic focus circuit as recited in claim 1 wherein each said rectifier means comprises a pair of oppositely poled diodes.

3. In a transistorized dynamic focus circuit as recited in claim 1 wherein said amplifying means includes a fourth transistor having a base input and collector output, the collector of said fourth transistor being connected to a suitable power supply, and further comprising feedback means including a variable impedance interconnecting the dynamic focus coil and the emitter of said fourth transistor.

4. In a dynamic focus circuit for a cathode ray tube provided with a variable current dynamic focus coil, an input inverter stage having one input and two outputs 180° out of phase, a pair of isolation stages each receiving one of said outputs, a pair of rectifier means each connected to receive the output from one of said isolation stages, common means interconnecting said rectifier means, and amplifier means connected to said common means to amplify a signal received from said common means for application to said dynamic focus coil.

5. In a dynamic focus circuit as recited in claim 4 wherein each said rectifier means comprises a pair of oppositely poled diodes.

6. In a dynamic focus circuit as recited in claim 4 the further improvement of feedback means including a variable impedance interconnecting the dynamic focus coil and said amplifier means.

7. A dynamic focus current generator for use with a flat-face cathode ray tube having a static focus coil and a dynamic focus coil having a first terminal and a second terminal comprising a phase inverter having two outputs 180° out of phase, a saw-tooth wave generator driving said phase inverter, a pair of current amplifying means, each receiving one of said outputs, a pair of rectifying means, one connected to receive the output from one of said current amplifying means, and the other connected to receive the output from the other of said current amplifying means, each of said rectifying means comprising a pair of oppositely poled diodes, means connecting the outputs of said pair of rectifying means to ground through a first resistor, means to amplify the signal developed across said first resistor, means to apply the amplified signal to the first terminal of the dynamic focus coil, variable resistor means connecting the second terminal of said dynamic focus coil to ground, and negative feedback means comprising means connecting said second terminal of said dynamic focus coil to said means to amplify the signal developed across the first resistor.

8. A dynamic focus current generator for use with a flat-faced cathode ray tube having a static focus coil and a dynamic focus coil, comprising means to generate a triangular wave, amplifying means to apply said triangular wave to said dynamic focus coil, and current feedback means coupling said dynamic focus coil to said amplifying means to apply a signal to said amplifying means for opposing said triangular wave, thereby to provide amplitude and phase correction to said triangular wave and thereby to maintain proper focusing of said flat-faced cathode ray tube.

References Cited in the file of this patent

UNITED STATES PATENTS

| | | |
|---|---|---|
| 2,698,400 | Schreiber | Dec. 28, 1954 |
| 2,762,949 | Huffman | Sept. 11, 1956 |
| 2,802,071 | Lin | Aug. 6, 1957 |
| 2,821,657 | Newhouse | Jan. 28, 1958 |
| 2,839,620 | Waldhauer | June 17, 1958 |
| 2,876,382 | Sziklai | Mar. 3, 1959 |
| 2,911,566 | Taylor | Nov. 3, 1959 |
| 2,922,071 | Hergenrother | Jan. 19, 1960 |